US010322657B2

(12) United States Patent
Aguirre et al.

(10) Patent No.: US 10,322,657 B2
(45) Date of Patent: Jun. 18, 2019

(54) CLIP ASSEMBLY FOR ALL-WEATHER MATS

(71) Applicant: Ford Global Technologies, LLC, Dearborn, MI (US)

(72) Inventors: Moises Aguirre, Tecamac (MX); Leonardo Alonso Huitron, Naucalpan de Jaurez (MX); Santiago Manuel Parra becerra, Ocoyoacac. Col. Juarez los Chirinos (MX); David K. Gonzalez Bojorges, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/658,893

(22) Filed: Jul. 25, 2017

(65) Prior Publication Data

US 2019/0031071 A1    Jan. 31, 2019

(51) Int. Cl.
*B60N 3/04* (2006.01)

(52) U.S. Cl.
CPC ............ *B60N 3/046* (2013.01); *B60N 3/04* (2013.01); *B60N 3/044* (2013.01)

(58) Field of Classification Search
CPC ........ B60N 3/044; B60N 3/046; B60N 3/048; B60N 2002/363
USPC ......... 296/97.23, 39.1, 39.3, 193.07, 100.01, 296/191, 202, 65.09; 16/4, 8; 428/95, 428/99, 98, 116, 105, 33, 67
See application file for complete search history.

(56) References Cited

U.S. PATENT DOCUMENTS

| 3,087,752 | A | * | 4/1963 | Winchester | ............ | B60K 26/02 15/215 |
| 4,829,627 | A | | 5/1989 | Altus et al. | | |
| 6,264,413 | B1 | * | 7/2001 | Bisping | .................. | F16B 13/04 411/15 |
| 6,381,806 | B1 | * | 5/2002 | Stanesic | ................. | B60N 3/046 16/4 |
| 8,080,302 | B2 | | 12/2011 | Gifford et al. | | |
| 8,690,222 | B2 | | 4/2014 | Johnson et al. | | |
| 8,882,171 | B2 | * | 11/2014 | Goto | ...................... | B60N 3/046 16/4 |
| 8,967,697 | B1 | * | 3/2015 | Yang | ...................... | B60N 3/048 296/97.23 |
| 2011/0062742 | A1 | | 3/2011 | Alford | | |

FOREIGN PATENT DOCUMENTS

CA    2706400 A1    12/2010
WO    2004045902 A1    6/2004

* cited by examiner

*Primary Examiner* — D Glenn Dayoan
*Assistant Examiner* — Sunsurraye Westbrook
(74) *Attorney, Agent, or Firm* — Vichit Chea; Price Heneveld LLP

(57) ABSTRACT

A clip assembly can be coupled to a vehicle floor mat where the clip assembly includes a top member having a cover, a gasket, first opposing body portions, an attachment member, and a first body. The clip assembly can additionally include a bottom member having a bezel, second opposing body portions, and a second body. The top member and the bottom member can be positioned and/or coupled in the vehicle floor mat with the attachment member coupled in the bezel.

20 Claims, 8 Drawing Sheets

CLIP ASSEMBLY FOR ALL-WEATHER MATS

FIELD OF THE INVENTION

The present invention generally relates to a clip assembly for a vehicle floor mat, and more specifically, to a clip assembly adapted to access a release handle while preventing moisture and dirt from reaching the carpeting of a vehicle.

BACKGROUND OF THE INVENTION

Vehicles have foot wells in which the driver and passengers may place their feet. These foot wells typically can have floor mats that are commonly used to cover the flooring surfaces. For example, floor mats may be used to protect floor and cargo areas of a vehicle against the elements. Floor mats currently available in the market include a piece of durable, pliable synthetic material having an outer wall for containing water, dirt, rocks, or the like. The mat can be positioned in a foot well, floor area, or cargo area of the vehicle in order to collect undesirable materials rather than having the materials accumulate on the surface or carpet of the floor, foot well, or cargo area. Floor mats are considered convenient because it is generally easy to remove and clean a mat by to shaking it out or hosing it off. While some mats may be carpeted, other mats may be fabricated from a synthetic polymer material. While mats often come with a vehicle purchase, there are many after-market mats available from a variety of different commercial sources. In some cases, the after-market mats are of a higher quality than the mats that initially come with the factory made vehicle.

Depending on the vehicle design and the included features, many vehicles contain a lever, switch, or pull tab to release a variety of features including the gas tank lid, the trunk, or the vehicle hood. When the lever, switch, or pull tab is positioned on the floor of the vehicle it may be inconvenient to lift up the entire floor mat to access the switch. Floor mats that are cut to have a hole to access the lever, switch, or pull tab can reintroduce problems with water and dirt soiling the carpet underneath.

Accordingly, there is a need for improved options for users to access the lever, switch, or pull tab positioned in the floor of a foot well, trunk, or other cargo area so that the carpet or surface of the vehicle may be protected.

SUMMARY OF THE INVENTION

According to one aspect of the present invention, a clip assembly for a vehicle floor mat is provided. The clip assembly includes a top member having a cover, a gasket, first opposing body portions, an attachment member, and a first body. The clip assembly further includes a bottom member having a bezel, second opposing body portions, and a second body. The top member and the bottom member are positioned in the vehicle floor mat with the attachment member coupled in the bezel.

Embodiments of the first aspect of the invention can include any one or a combination of the following features:
  the cover is coupled to the first body with a living hinge;
  the bezel includes a receiving clip member on an inner wall of the second body;
  the first and second opposing body portions of the top and bottom members pinch in the vehicle floor mat;
  the cover has a closed position with the cover coupled to the gasket of the first body with a snap fit;
  the first and second bodies and the first and second opposing body portions are made from a polyacetal;
  the clip assembly is used to cover a floor fuel door lever;
  the cover includes a lift tab;
  the clip assembly is a water proof seal for the vehicle floor mat; and
  the clip assembly is removably coupled to the vehicle floor mat.

According to another aspect of the present invention, a vehicle floor mat is provided. The vehicle floor mat includes a floor mat having an opening and a clip assembly. The clip assembly includes a top member having a cover, a gasket, first opposing body portions, an attachment member, and a first body. The clip assembly further includes a bottom member having a bezel, second opposing body portions, and a second body. The top member and the bottom member are removably positioned in the vehicle floor mat with the attachment member coupled in the bezel.

Embodiments of the second aspect of the invention can include any one or a combination of the following features:
  the vehicle floor mat is an all-weather floor mat;
  the clip assembly is used to cover a switch, a lever, a button, a hole, a sensor, an activator, or a combination thereof;
  the clip assembly provides a water proof seal for the vehicle floor mat; and
  the first and second opposing body portions of the top and bottom members attach to the floor mat.

According to yet another aspect of the present invention, a clip assembly is provided. The clip assembly includes a top member having a cover, a gasket, first opposing body portions, an attachment member, and a first body. The clip assembly further includes a bottom member having a bezel, second opposing body portions, and a second body. The top and bottom members are coupled using the attachment member and the bezel.

Embodiments of the third aspect of the invention can include any one or a combination of the following features:
  the cover includes a lift tab;
  the first and second opposing body portions of the top and bottom members attach to a vehicle floor mat;
  the clip assembly is used to cover a switch, a lever, a button, a hole, a sensor, a activator, or a combination thereof; and
  the clip assembly is removable or can be coupled to a vehicle floor mat.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
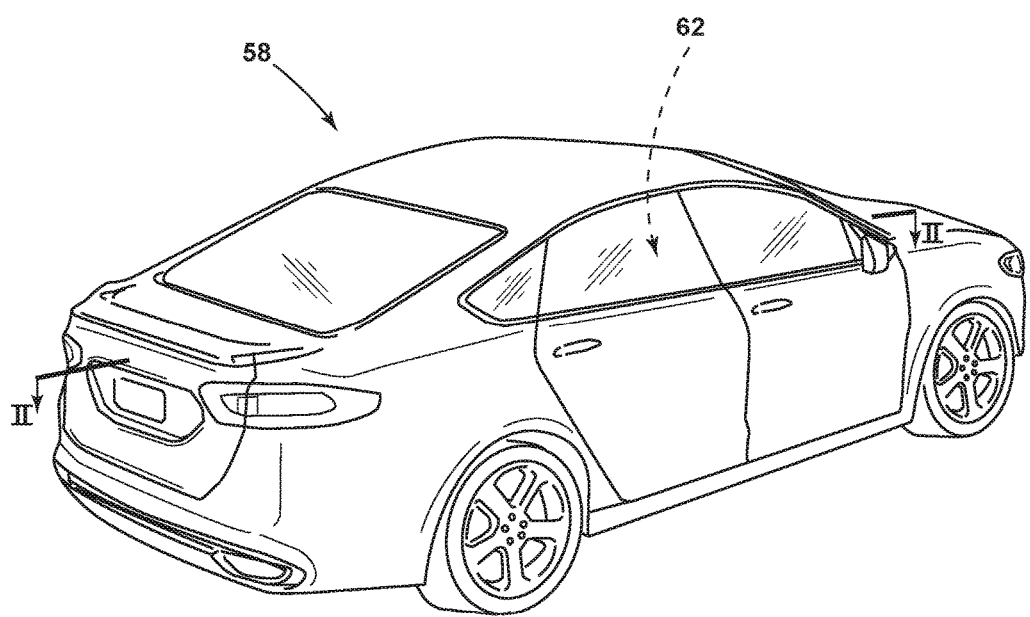
FIG. 1 is a front perspective view of a vehicle.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, reference numeral 10 generally designates a clip assembly. The clip assembly 10 can be coupled to a vehicle floor mat 14 where the clip assembly 10 includes a top member 18 having a cover 22, a gasket 26, first opposing body portions 30, an attachment member 34, and a first body 38. The clip assembly 10 can additionally include a bottom member 42 having a bezel 46, second opposing body portions 50, and a second body 54. The top member 18 and the bottom member 42 can be positioned and/or coupled in the vehicle floor mat 14 with the attachment member 34 coupled in the bezel 46.

Referring to FIG. 1, a wheeled automotive vehicle 58 is provided having a passenger compartment 62. The vehicle 58 is shown as a car although the type of vehicle 58 is not meant to be limiting and the vehicle 58 could additionally be, for example, a minivan, truck, commercial vehicle, or any other wheeled motorized vehicle.

Figure 2:
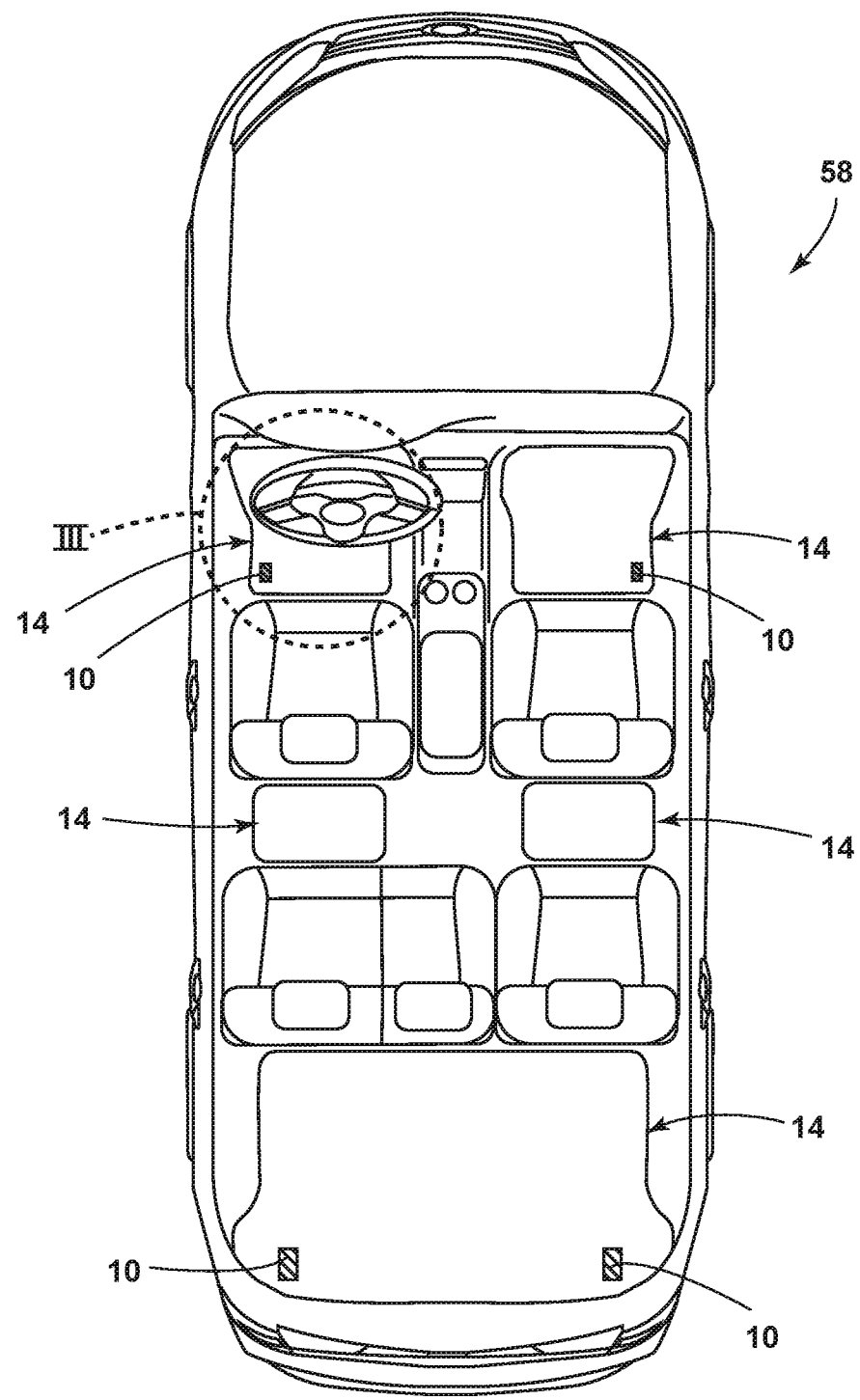
FIG. 2 is a cross-sectional view of the vehicle presented in FIG. 1 taken along the portion II, according to some aspects of the present disclosure.

Referring now to FIG. 2, a top cross-sectional view of the vehicle 58 provided in FIG. 1 is provided showing several floor mats 14 positioned throughout the vehicle 58. The position of the floor mat(s) 14 is not meant to be limiting and may be positioned, for example, in one or more foot wells, a trunk bed, a cargo space, a storage compartment, or a combination thereof. Depending on the position of the floor mat 14 and design of the vehicle 58, the clip assembly 10 may be coupled to the floor mat 14 to provide access for a user to reach a release handle 70 positioned beneath the floor mat 14. The release handle 70 is not meant to be limiting and may include, for example, a lever, switch, or pull tab, a button, a handle, a cord, a cable, a hole, an activator, or a combination thereof. In some aspects, the clip assembly 10 may be coupled in articles other than the floor mat 14, for example, a rug, a cover, a hard surface such as cement, wood, stone, or a combination thereof. In some aspects, the clip assembly 10 is used to cover a floor fuel door lever.

Figure 3:
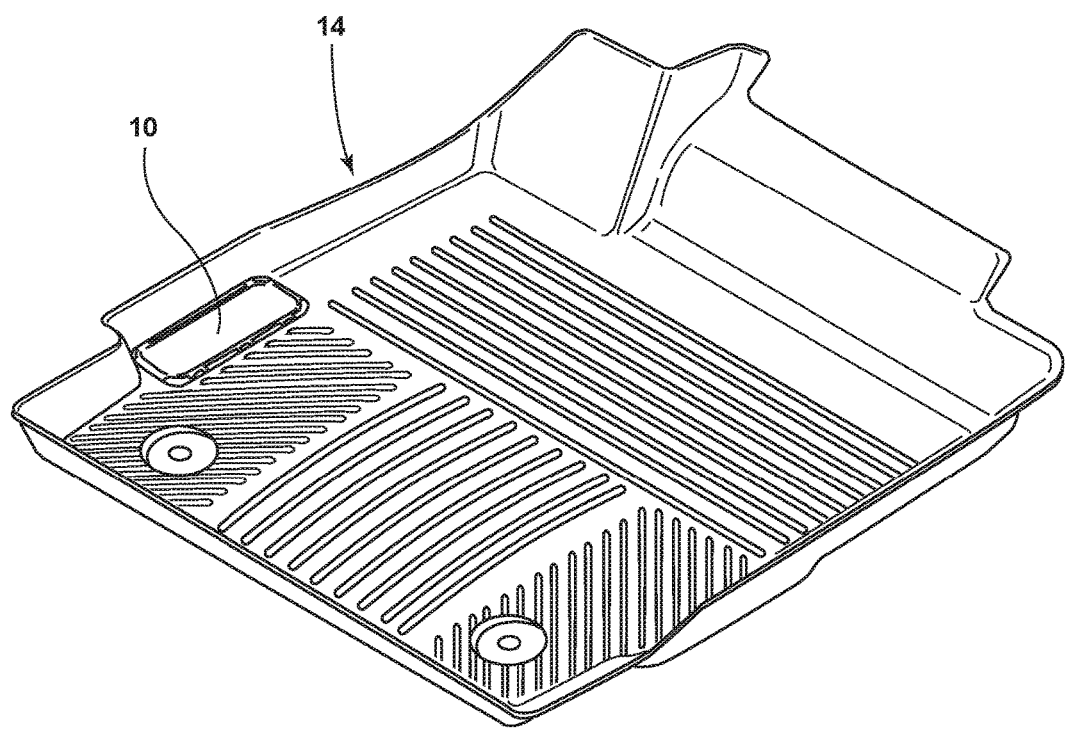
FIG. 3 is a front perspective view of a vehicle floor mat having a clip assembly according to some aspects of the present disclosure.

Referring now to FIG. 3, the floor mat 14 is shown coupled to the clip assembly 10. As shown in FIG. 3, the clip assembly 10 can have a rectangular shape from the perspective of looking down at the surface of the floor mat 14 but the shape and/or dimensions are not meant to be limiting. For example, in some aspects, the clip assembly 10 may have a rectangular shape, a square shape, an oval shape, a polygonal shape, or a triangular shape. In some aspects, the floor mat 14 may be an all-weather floor mat made from a variety of different materials. The floor mat 14 may be fabricated from a thermoset polymer, a thermoplastic polymer, a rubber, a siloxane, a natural rubber, a polyolefin such as low density polyethylene, high density polyethylene, polypropylene, polystyrene, or any other polymer blend known in the art.

The clip assembly 10 provides a series of advantages such as providing easy access to the release handle 70 while providing protection to the underlying carpet or surface from water, dirt, and/or other particulates. In some aspects, the clip assembly 10 is a water proof seal for the vehicle floor mat 14. The clip assembly 10 may be coupled to or removed from the floor mat 14 as desired by the user. In some aspects, the clip assembly 10 is removably coupled to the vehicle floor mat 14. The clip assembly 10 has a snap fit where the cover 22 may be put in a closed position with the cover 22 positioned against the first body 38. In some aspects, the gasket 26 may be positioned and/or pinched between the cover 22 and the first body 38 to add additional protection from water, dirt, and/or particulate matter. The clip assembly 10 may be fabricated in a variety of different colors to visually cue the user where to access the appropriate release handle 70 on the vehicle 58.

Figure 4:
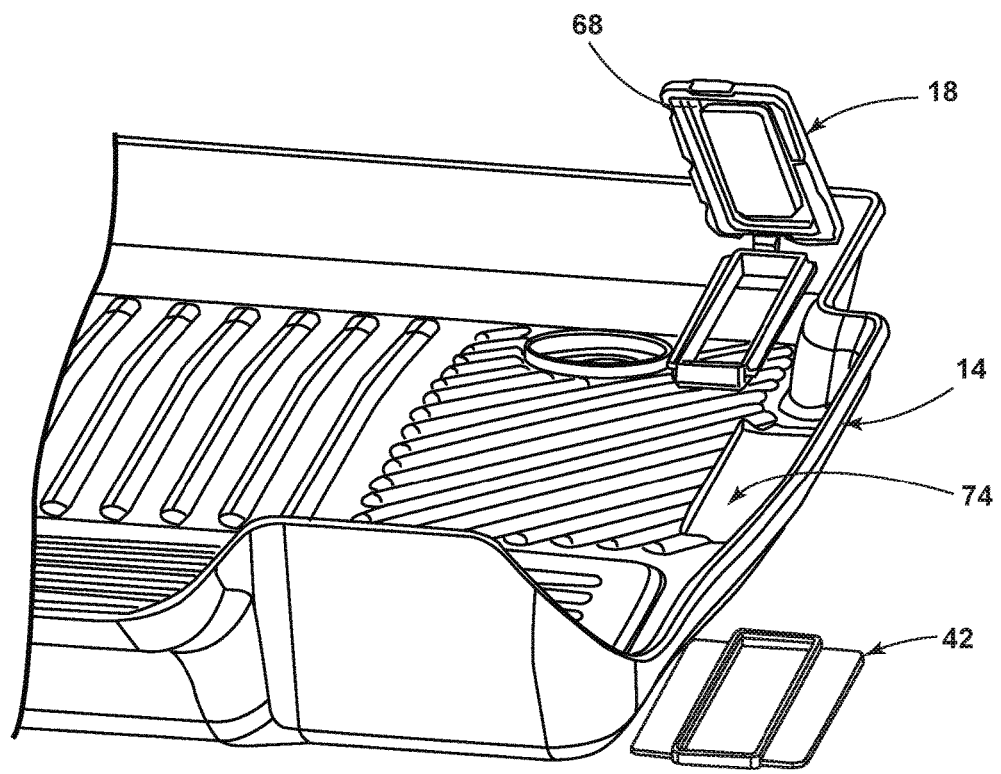
FIG. 4 is an exploded view of the clip assembly positioned with respect to the vehicle floor mat according to some aspects of the present disclosure.

Referring now to FIG. 4, an exploded view of the clip assembly 10 is shown positioned above and below an opening 74 of the floor mat 14 when installing or removing the clip assembly 10. The clip assembly 10 includes the top member 18 and the bottom member 42 as shown. The top member 18 includes a cover channel 68 that may be used to insert the gasket 26 (FIG. 5) or be used to form a seal around the bottom member 42. The top member 18 and the bottom member 42 can be positioned and/or coupled in the vehicle floor mat 14 with the attachment member 34 coupled in the bezel 46 as described in FIG. 7. The first and second bodies 38, 54 and the first and second opposing body portions 30, 50 (FIG. 5) of the clip assembly 10 may be made from a polyacetal, a thermoset polymer, a thermoplastic polymer, a rubber, a siloxane, a natural rubber, a polyolefin such as low density polyethylene, high density polyethylene, polypropylene, polystyrene, or any other polymer blend known in the art. In some aspects, the first and second bodies 38, 54 and the first and second opposing body portions 30, 50 of the clip assembly 10 may be made from a polyacetal.

Figure 5:
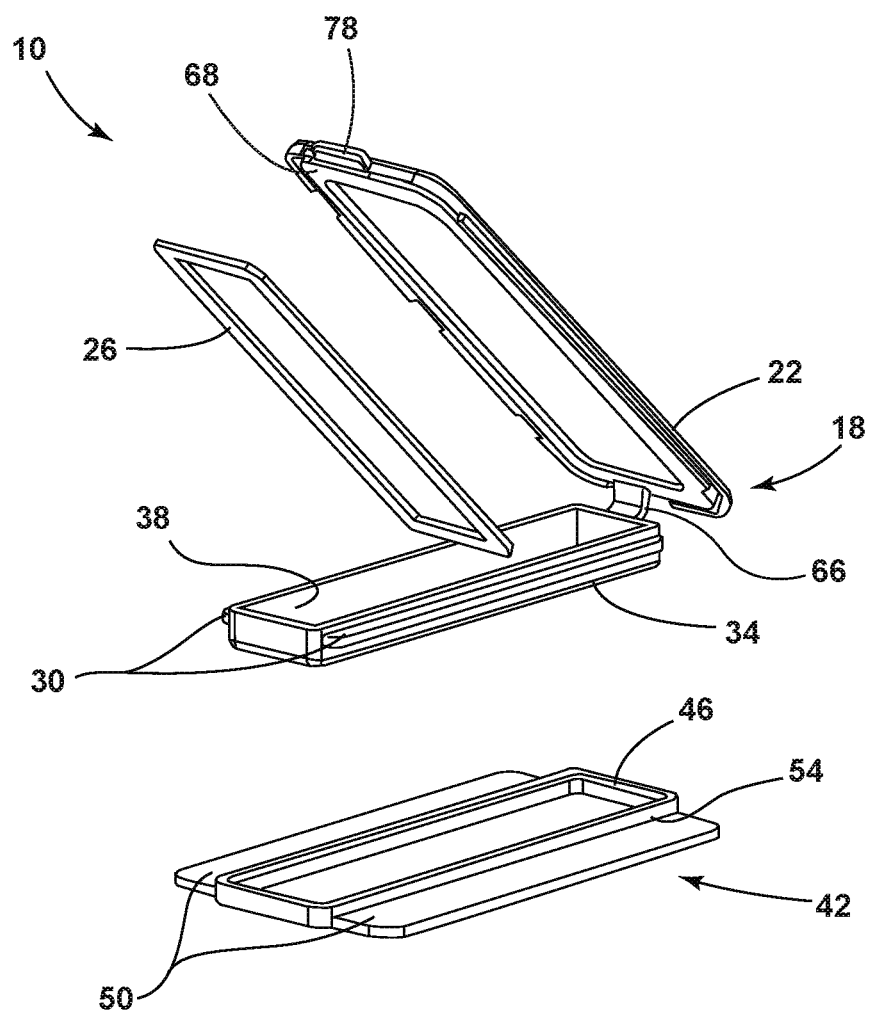
FIG. 5 is an exploded view of the clip assembly according to some aspects of the present disclosure.

Referring now to FIG. 5, an exploded view of the clip assembly 10 is provided. The top member 18 includes the cover 22, first opposing body portions 30, the attachment member 34, and the first body 38. In some aspects, the top member 18 may additionally include a living hinge 66 and the gasket 26 positioned in the cover channel 68. The living hinge 66 may couple the top member 18 to the bottom member 42 of the clip assembly 10. In still other aspects, the top member 18 may include a lift tab 78 coupled to the cover 22 to assist the user opening and closing the clip assembly 10. The lift tab 78 may be positioned on any edge of the cover 22 except the edge coupled to the living hinge 66. The bottom member 42 of the clip assembly 10 includes the bezel 46, second opposing body portions 50, and the second body 54.

Figure 6:
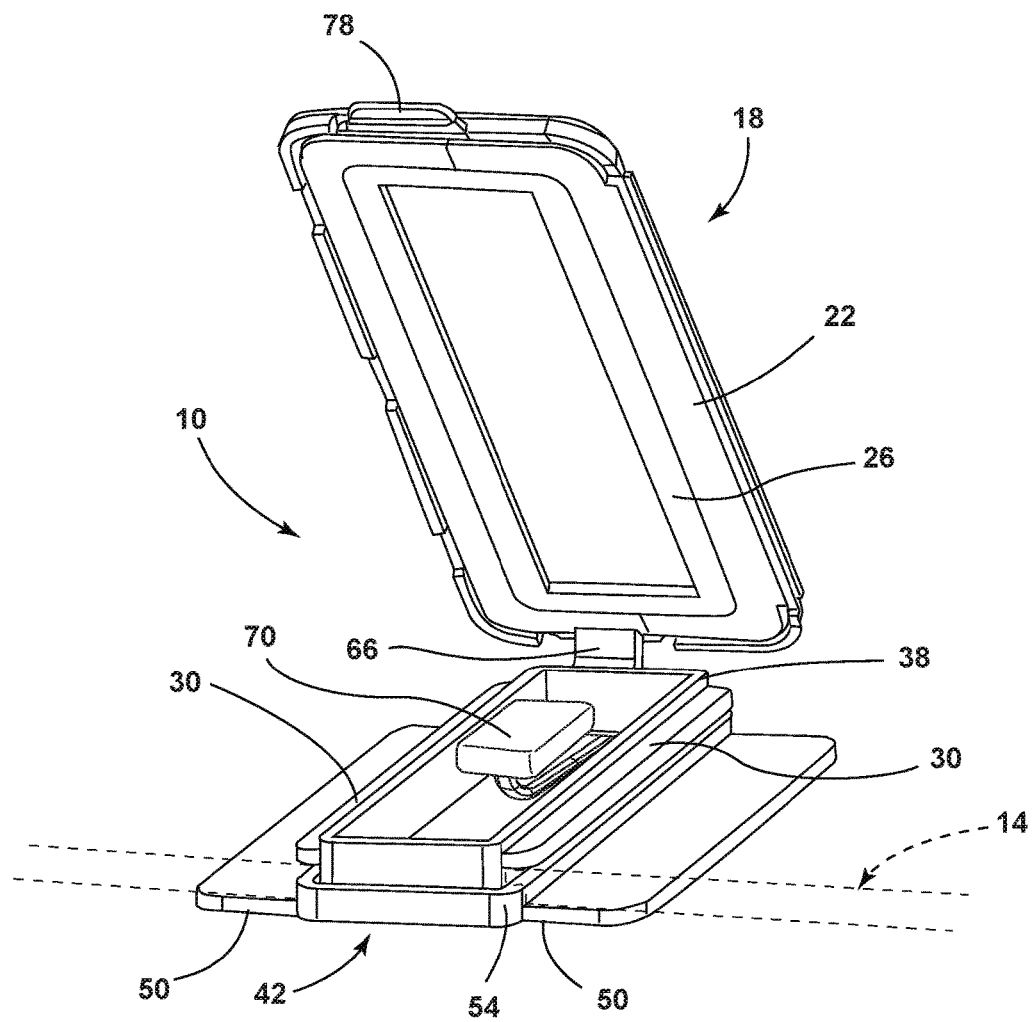
FIG. 6 is a front perspective view of the clip assembly inserted into the vehicle floor mat according to some aspects of the present disclosure.

Referring now to FIG. 6, the clip assembly 10 is shown assembled having the top member 18 coupled to the bottom member 42 with the first and second opposing body portions 30, 50 pinching the floor mat 14 between the first and second opposing body portions 30, 50 coupled to the first body 38 and the second body 54, respectively. The floor mat 14 may be pinched or positioned between the first opposing body portions 30 of the top member 18 and the second opposing body portions 50 of the bottom member 42 to immobilize and lock in the clip assembly 10 to the floor mat 14. The clip assembly 10 is shown in an open position with the cover 22 flipped up in an open position. The cover 22 is coupled to the first body 38 with the living hinge 66.

Figure 7:
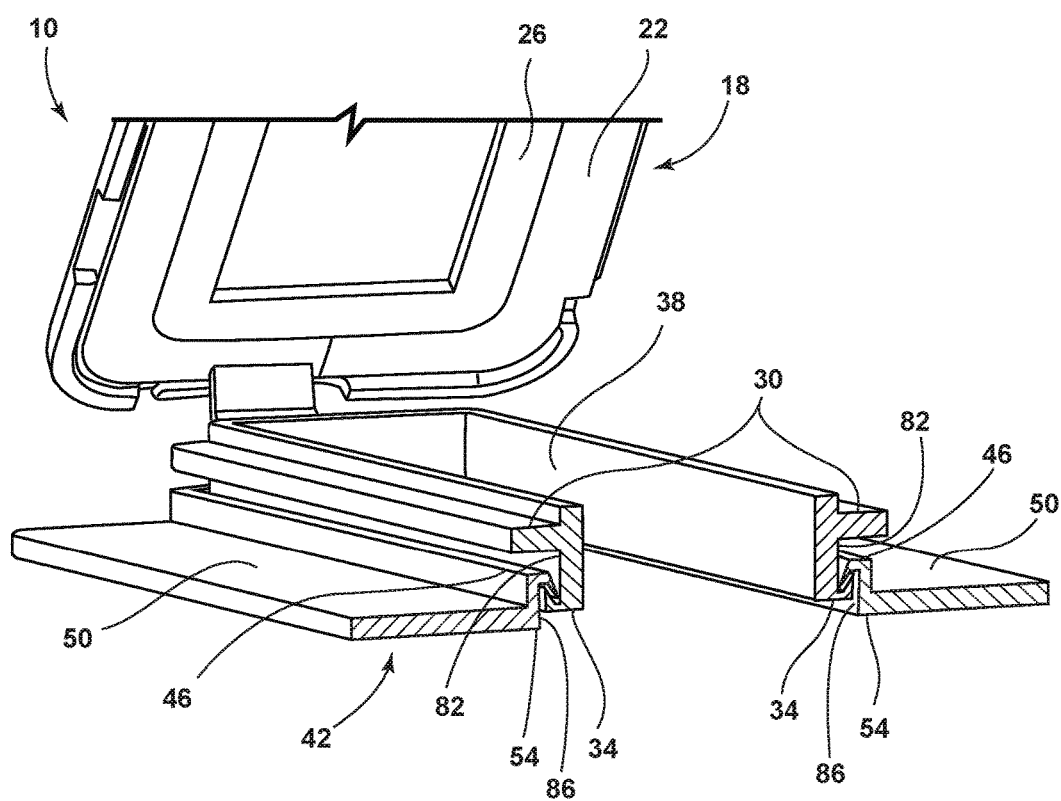
FIG. 7 is a cross-sectional view of the attachment portions of the clip assembly according to some aspects of the present disclosure.

Referring now to FIG. 7, a cross section of the clip assembly 10 is shown having the top member 18 coupled to the bottom member 42. The top member 18 and the bottom member 42 are positioned or coupled into the floor mat 14 using the attachment member 34 and the bezel 46. In some aspects, the attachment member 34 may include an attachment rib, an attachment clip, an attachment hook, an attachment ledge, an attachment detent, an attachment notch, an attachment lip, or a combination thereof to couple the top member 18 to the bottom member 42. In some aspects, the bezel 46 may also include a receiving rib, a receiving clip, a receiving hook, a receiving ledge, a receiving detent, a receiving notch, a receiving lip, or a combination thereof to couple the bottom member 42 to the top member 18. The attachment member 34 may be formed, molded, and/or extruded on one or more outer walls 82 of the top member 18. In some aspects, the attachment member 34 may include one, two, three, four, or more sides that each includes an attachment clip member on the outer wall 82 of the first body 38. The bezel 46 may be formed, molded, and/or extruded on one or more inner walls 86 of the bottom member 42. In some aspects, the bezel 46 may include one, two, three, four, or more sides that each includes a receiving clip member on the inner wall 86 of the second body 54. As the first body 38 of the top member 18 is slid or positioned into the second body 54 of the bottom member 42, the attachment member 34 can couple the bezel 46 while the opposing body members 30, 50 pinch down and maintain the clip assembly's 10 positioning with respect to the floor mat 14. In some aspects, the bottom member 42 may include the attachment member 34 as described above and the top member 18 may include the bezel 46 as described above.

Figure 8:
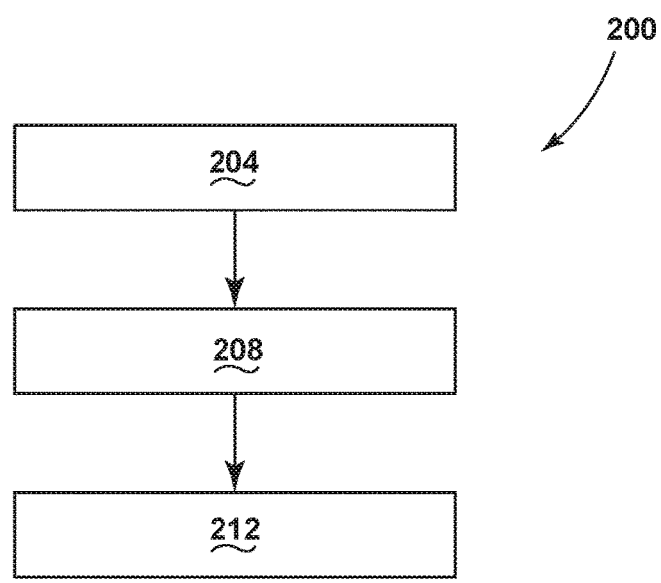
FIG. 8 is a flow diagram of a method for coupling the clip assembly to a vehicle floor mat according to some aspects of the present disclosure.

Referring now to FIG. 8, with continued reference to FIGS. 1-7, a method 200 for coupling the clip assembly 10 to the floor mat 14 is shown. The method 200 may begin with a step 204 that includes providing the top member 18 having the cover 22, the gasket 26, the first opposing body portions 30, the attachment member 34, and the first body 38. The cover 22 is coupled to the first body 38 with the living hinge 66. The top member 18 may be molded, extruded, or generally formed from a thermoplastic and/or thermoset polymer. In some aspects, the top member 18 may not have the gasket 26.

Next is a step 208 of providing the bottom member 42 having the bezel 46, second opposing body portions 50, and the second body 54. The bottom member 42 may be molded, extruded, or generally formed from a thermoplastic and/or thermoset polymer.

Next is a step 212 of coupling the top member 18 to the bottom member 42 where the floor mat 14 has the clip assembly 10 inserted using the attachment member 34 coupled to the bezel 26. As the first body 38 of the top member 18 is slid or positioned into the second body 54 of the bottom member 42, the attachment member 34 can couple the bezel 46 while the opposing body members 30, 50 pinch down and maintain the clip assembly's 10 positioning with respect to the floor mat 14. In some aspects, the bottom member 42 may include the attachment member 34 as described above and the top member 18 may include the bezel 46 as described above. The top member 18 may be removed from the bottom member 42 by applying pressure towards the center of the clip assembly 10 to allow the attachment member 34 to be pulled past the bezel 46 to remove the top and bottom members 18, 42 from each other.

It is understood that the descriptions outlining and teaching the clip assembly 10 previously discussed, which can be used in any combination, apply equally well to the method 200 for coupling the clip assembly 10 to the vehicle floor mat 14.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A clip assembly for a vehicle floor mat comprising:
a top member having a cover, a gasket, first opposing body portions, an attachment member, and a first body; and
a bottom member having a bezel, second opposing body portions, and a second body;
wherein the attachment member includes an attachment clip on an outer wall of the first body and the bezel includes a receiving clip on an inner wall of the second body;
wherein the top member and the bottom member are positioned in the vehicle floor mat with the attachment clip coupled to the receiving clip.

2. The clip assembly of claim 1, wherein the cover is coupled to the first body with a living hinge.

3. The clip assembly of claim 1, wherein the first and second opposing body portions of the top and bottom members pinch in the vehicle floor mat.

4. The clip assembly of claim 1, wherein the cover has a closed position with the cover coupled to the gasket of the first body with a snap fit.

5. The clip assembly of claim 1, wherein the first and second bodies and the first and second opposing body portions are made from a polyacetal.

6. The clip assembly of claim 1, wherein the clip assembly is used to cover a floor fuel door lever.

7. The clip assembly of claim 1, wherein the cover includes a lift tab.

8. The clip assembly of claim 1, wherein the clip assembly is a water proof seal for the vehicle floor mat.

9. The clip assembly of claim 1, wherein the clip assembly is removably coupled to the vehicle floor mat.

10. A vehicle floor mat comprising:
a floor mat having an opening; and
a clip assembly comprising:
a top member having a cover, a gasket, first opposing body portions, an attachment member, and a first body; and
a bottom member having a bezel, second opposing body portions, and a second body;
wherein the attachment member includes an attachment clip and the bezel includes a receiving clip;
wherein the top member and the bottom member are removably positioned in the vehicle floor mat with the attachment clip coupled to the receiving clip.

11. The floor mat of claim 10, wherein the vehicle floor mat is an all-weather floor mat.

12. The floor mat of claim 10, wherein the clip assembly is used to cover a switch, a lever, a button, a hole, a sensor, an activator, or a combination thereof.

13. The floor mat of claim 10, wherein the clip assembly provides a water proof seal for the vehicle floor mat.

14. The floor mat of claim 10, wherein the first and second opposing body portions of the top and bottom members attach to the floor mat.

15. A clip assembly comprising:
a top member having a cover, a gasket, first opposing body portions, an attachment member, and a first body; and
a bottom member having a bezel, second opposing body portions, and a second body;
wherein the attachment member includes an attachment clip on an outer wall of the first body and the bezel includes a receiving clip on an inner wall of the second body;
wherein the top and bottom members are coupled using the attachment clip and the receiving clip.

16. The clip assembly of claim 15, wherein the cover includes a lift tab.

17. The clip assembly of claim 15, wherein the first and second opposing body portions of the top and bottom members attach to a vehicle floor mat.

18. The clip assembly of claim 15, wherein the clip assembly is used to cover a switch, a lever, a button, a hole, a sensor, a activator, or a combination thereof.

19. The clip assembly of claim 15, wherein the clip assembly is removable or can be coupled to a vehicle floor mat.

20. The clip assembly of claim 1, wherein the clip assembly is used to cover a release handle.

* * * * *